United States Patent
Kitagawa

(10) Patent No.: US 12,030,175 B2
(45) Date of Patent: Jul. 9, 2024

(54) INFORMATION PROCESSING DEVICE, DRIVING CONTROL METHOD, AND PROGRAM-RECORDING MEDIUM

(71) Applicant: NEC Corporation, Tokyo (JP)

(72) Inventor: Takeharu Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 445 days.

(21) Appl. No.: 17/418,431

(22) PCT Filed: Feb. 19, 2020

(86) PCT No.: PCT/JP2020/006430
§ 371 (c)(1),
(2) Date: Jun. 25, 2021

(87) PCT Pub. No.: WO2020/184101
PCT Pub. Date: Sep. 17, 2020

(65) Prior Publication Data
US 2022/0055226 A1 Feb. 24, 2022

(30) Foreign Application Priority Data
Mar. 13, 2019 (JP) .................. 2019-046023

(51) Int. Cl.
*B25J 13/08* (2006.01)
*B25J 19/02* (2006.01)
(Continued)

(52) U.S. Cl.
CPC .............. *B25J 13/08* (2013.01); *B25J 19/023* (2013.01); *G06N 20/00* (2019.01); *G06T 7/70* (2017.01)

(58) Field of Classification Search
CPC ........... B25J 13/08; B25J 19/023; G06T 7/70; G06N 20/00
See application file for complete search history.

(56) References Cited

U.S. PATENT DOCUMENTS

2013/0243331 A1* 9/2013 Noda ................. G06V 10/7515
382/195
2016/0151916 A1 6/2016 Kanno et al.
(Continued)

FOREIGN PATENT DOCUMENTS

JP H05318345 A 12/1993
JP 2005208833 A 8/2005
(Continued)

OTHER PUBLICATIONS

International Search Report for PCT Application No. PCT/JP2020/006430, mailed on Mar. 24, 2020.
(Continued)

*Primary Examiner* — Peter D Nolan
*Assistant Examiner* — Mikko Okechukwu Obioha

(57) ABSTRACT

In order to simplify the control configuration for controlling a driving device and improve reliability of the operation of the driving device, an information processing device includes a detection unit and a processing unit. The detection unit detects the detection target from a captured image by using reference data that is a learning result obtained by machine learning of the detection target including the position of the center of gravity of the object in the captured image. The processing unit controls the driving device to be controlled that acts on the object having the center of gravity detected by the detection unit, by using the detection result of the detection unit.

7 Claims, 12 Drawing Sheets

(51) Int. Cl.
    *G06N 20/00*        (2019.01)
    *G06T 7/70*         (2017.01)

(56) References Cited

U.S. PATENT DOCUMENTS

| | | |
|---|---|---|
| 2018/0276501 A1 | 9/2018 | Yamada et al. |
| 2019/0061159 A1 | 2/2019 | Domae et al. |
| 2019/0065519 A1 | 2/2019 | Ohtsuji |
| 2020/0189116 A1* | 6/2020 | Shoji ................... B25J 9/1607 |
| 2020/0202175 A1* | 6/2020 | Hieida ..................... G06T 7/00 |
| 2023/0033339 A1* | 2/2023 | Namiki ................. B25J 9/1697 |
| 2023/0125022 A1* | 4/2023 | Li ........................ G05B 19/42 |
| | | 700/245 |

FOREIGN PATENT DOCUMENTS

| | | |
|---|---|---|
| JP | 2007085745 A | 4/2007 |
| JP | 2007124269 A | 5/2007 |
| JP | 2013191163 A | 9/2013 |
| JP | 2016107349 A | 6/2016 |
| JP | 2018161692 A | 10/2018 |
| JP | 2019029021 A | 2/2019 |
| JP | 2019046023 A | 3/2019 |
| WO | 2017183414 A1 | 10/2017 |

OTHER PUBLICATIONS

English translation of Written opinion for PCT Application No. PCT/JP2020/006430, mailed on Mar. 24, 2020.

* cited by examiner

INFORMATION PROCESSING DEVICE, DRIVING CONTROL METHOD, AND PROGRAM-RECORDING MEDIUM

This application is a National Stage Entry of PCT/JP2020/006430 filed on Feb. 19, 2020, which claims priority from Japanese Patent Application 2019-046023 filed on Mar. 13, 2019, the contents of all of which are incorporated herein by reference, in their entirety.

TECHNICAL FIELD

The present invention relates to a technique for controlling a driving device by using information acquired from captured images.

BACKGROUND ART

There is a method of detecting an object from a captured image and controlling a device by using the detected information.

PTL 1 discloses a method of, when it is detected from an image of a monitoring camera that a suspicious intruder has entered an important area, spraying water toward the intruder to inhibit the action of the intruder.

PTL 2 discloses a method of detecting intrusion of an intruder into a vehicle by using an image captured by a stereo camera and distance information in a depth direction acquired by the stereo camera.

CITATION LIST

Patent Literature

[PTL 1] JP 2007-124269 A
[PTL 2] JP 2005-208833 A

SUMMARY OF INVENTION

Technical Problem

In a case of controlling a driving device, the driving device is sometimes controlled by acquiring a sensor output of a high-performance sensor or performing complicated calculation in order to acquire information on an object on which the driving device acts. However, the control of the driving device is required not only to improve reliability of the device operation but also to simplify the control configuration.

The present invention has been devised in order to solve the above problem. That is, a main object of the present invention is to provide a control technique that can simplify the control configuration for controlling a driving device and improve reliability of the operation of the driving device.

Solution to Problem

In order to achieve the above object, an embodiment of an information processing device according to the present invention includes
a detection unit that detects a detection target from a captured image by using reference data that is a learning result obtained by machine learning of the detection target including a position of a center of gravity of an object in the captured image, and
a processing unit that controls a driving device to be controlled that acts on the object by using a detection result of the detection unit.

An embodiment of a driving control method according to the present invention includes
detecting a detection target from a captured image by using reference data that is a learning result obtained by machine learning of the detection target including a position of a center of gravity of an object in the captured image, and
controlling a driving device to be controlled that acts on the object by using a result of the detection.

Moreover, an embodiment of a program-recording medium according to the present invention stores a computer program for causing a computer to execute
detecting a detection target from a captured image by using reference data that is a learning result obtained by machine learning of the detection target including a position of a center of gravity of an object in the captured image, and
controlling a driving device to be controlled that acts on the object by using a result of the detection.

Advantageous Effects of Invention

According to the present invention, it is possible to simplify the control configuration for controlling a driving device and improve reliability of the operation of the driving device.

EXAMPLE EMBODIMENT

Hereinafter, an example embodiment according to the present invention will be described with reference to the drawings.

First Example Embodiment

Figure 1:
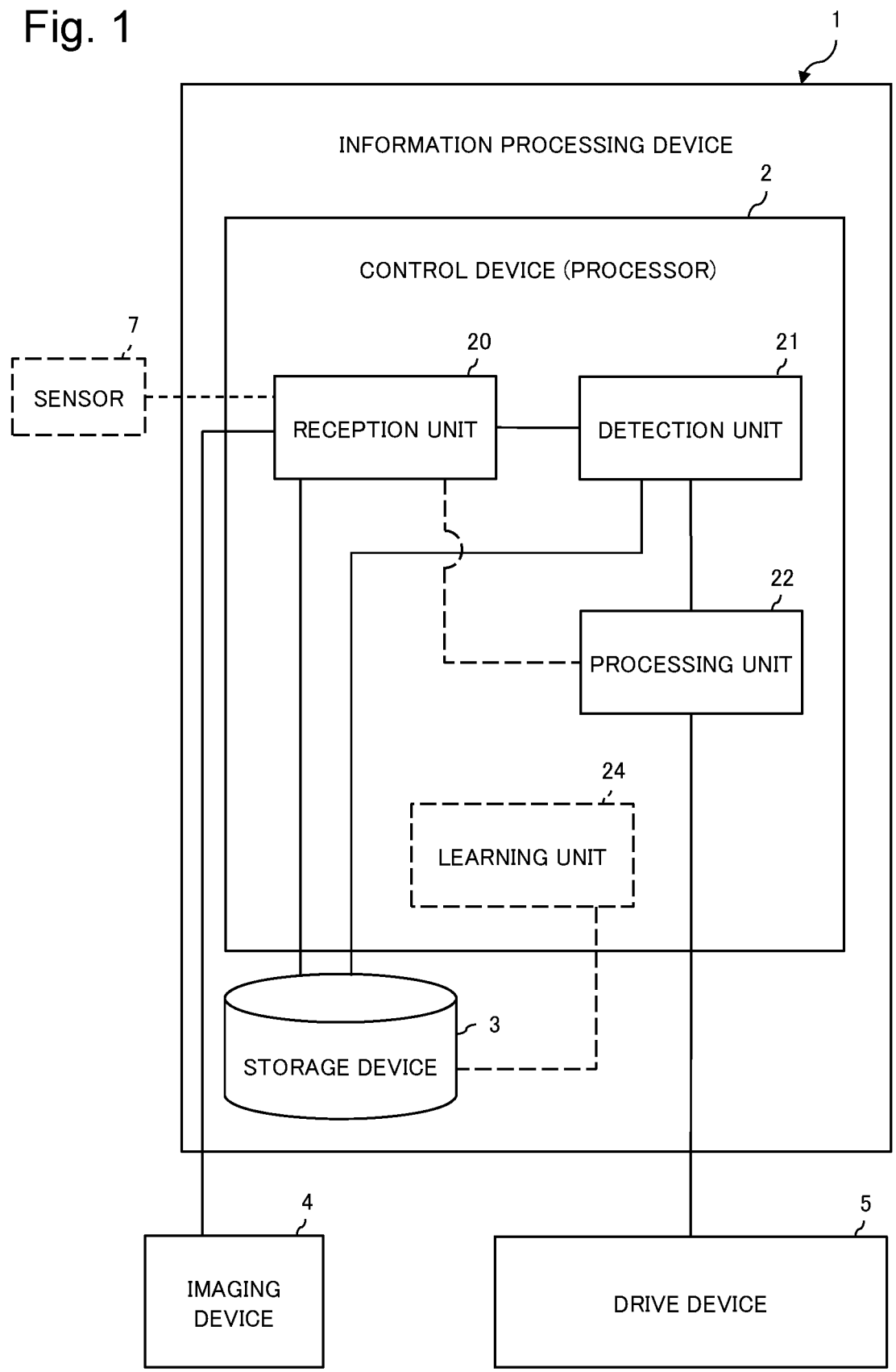
FIG. 1 is a block diagram illustrating a simplified configuration of an information processing device according to a first example embodiment of the present invention.
Figure 2:
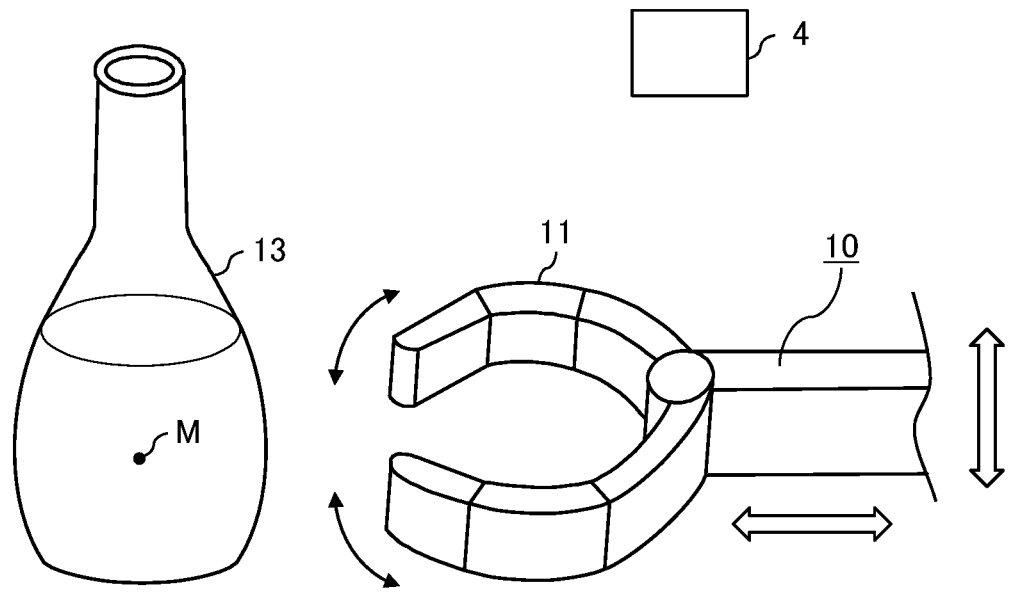
FIG. 2 is a diagram illustrating an example of a driving device controlled by the information processing device of the first example embodiment and an example of an object on which the driving device acts.

FIG. 1 is a block diagram illustrating a simplified configuration of an information processing device according to a first example embodiment of the present invention. An information processing device 1 of the first example embodiment is connected to an imaging device 4 and a driving device 5, and has a function of controlling the operation of the driving device 5 by using images captured by the imaging device 4. In the first example embodiment, the driving device 5 is a robot arm 10 as illustrated in FIG. 2, and a hand 11 included in the robot arm 10 includes a mechanism capable of gripping an object 13. The imaging device 4 is installed at an installation position determined by a control method for controlling the hand 11 of the robot arm 10, where a predetermined work area of the hand 11 of the robot arm 10 is included in an imaging range. The information processing device 1 controls the gripping operation of the hand 11 of the robot arm 10 by using images captured by the imaging device 4.

That is, as illustrated in FIG. 1, the information processing device 1 includes a control device 2 and a storage device 3.

The storage device 3 has a function of storing various data and computer programs, and is implemented by, for example, a storage medium such as a hard disk device or a semiconductor memory. The number of storage devices included in the information processing device 1 is not limited to one, and multiple types of storage devices may be included in the information processing device 1. In this case, the multiple storage devices are collectively referred to as a storage device 3. The information processing device 1 may be connected to an external storage device (not illustrated) separate from the information processing device 1. In a case where the information processing device 1 is connected to an external storage device, the information processing device 1 appropriately performs processing of writing and reading information to and from the external storage device. However, description of processing related to the external storage device will be omitted in the following description.

In the first example embodiment, the storage device 3 stores reference data (also referred to as dictionary or model) generated by machine learning. The reference data is data used in detection processing of detecting a predetermined detection target from a captured image, and is generated by machine learning using the following teacher data, in the first example embodiment.

Figure 4:
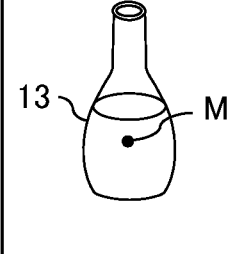
FIG. 4 is a diagram for describing teacher data used for generating reference data to be used by the information processing device according to the first example embodiment.

In the first example embodiment, the detection target to be detected from a captured image is the object 13 to be gripped by the hand 11 of the robot arm 10 as illustrated in FIG. 2, and the position of a center of gravity M of the object 13. In this case, as teacher data, teacher data as illustrated in FIG. 4 is used for generating reference data. That is, in the example of FIG. 4, as teacher data, reference images, images with background, partial images, and deformed images including images of the detection target (object 13 to be gripped and position of center of gravity M of object 13), are used for generating the reference data.

A reference image is an image that satisfies all of the following conditions: the entire image of the object 13 to be gripped is included; the center of gravity M of the object 13 to be gripped is located at the center of the image; and appearance of background other than the object to be gripped is avoided. An image with background is an image in which the center of gravity M of the object 13 to be gripped is located at the center of the image, and which includes the entire object 13 to be gripped and a background representing objects other than the object 13 to be gripped. A partial image is an image in which the center of gravity M of the object 13 to be gripped is located at the center of the image, and which represents a part of the object 13 to be gripped. A deformed image is an image in which the posture or the like of the object 13 to be gripped is different from that of the object 13 to be gripped in the reference image, such as an image in which the object 13 to be gripped is tilted. In the deformed image, too, the center of gravity M of the object 13 to be gripped is located at the center of the image.

In the example of FIG. 4, the object 13 to be gripped is a bottle, and the position of the center of gravity M changes depending on the amount of content and the like. In consideration of this, the reference image, image with background, partial image, and deformed image as described above for each of objects 13 to be gripped having different content amounts are used as teacher data for generating reference data.

Figure 5:
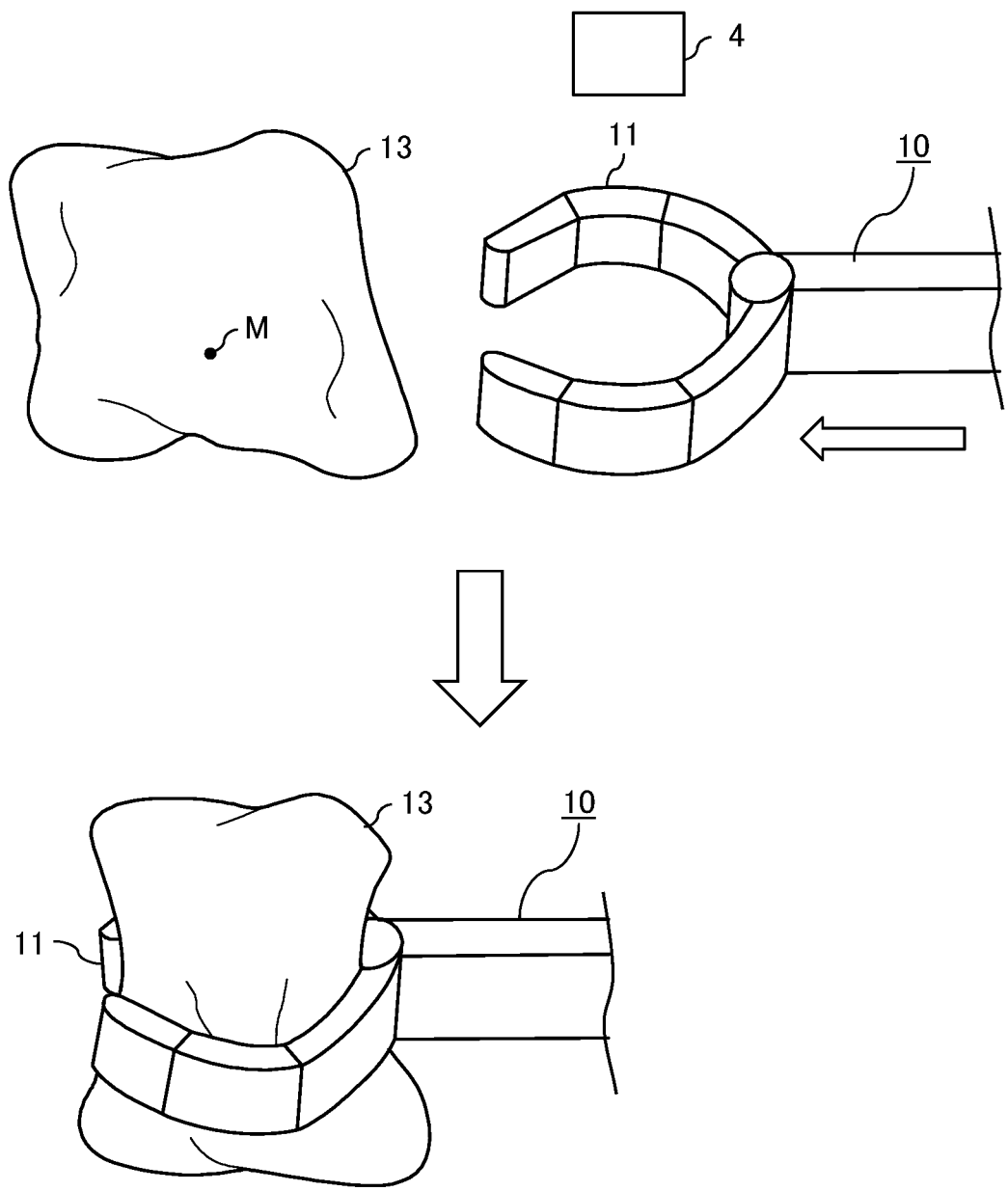
FIG. 5 is a diagram illustrating an operation example of the driving device controlled by the information processing device of the first example embodiment.

Moreover, as the object gripped by the hand 11 of the robot arm 10, an object other than the object (bottle) 13 as illustrated in FIGS. 2 and 4 may be assumed. That is, there may be multiple types of objects to be detected in the detection processing in the information processing device 1. In such a case, the reference image, image with background, partial image, and deformed image as described above for each of the multiple types of objects to be detected are used as teacher data for generating reference data. FIG. 5 illustrates an example of another object gripped by the hand 11 of the robot arm 10. The object 13 to be gripped illustrated in FIG. 5 is a cushioning material to be inserted into a gap between goods and a box when the goods are packed in the box. Since the outer shape of the cushioning material is easily deformed, an image considering the fact that the outer shape is easily deformable is used as teacher data used for generating reference data.

The reference data used in the detection processing of detecting the detection target from a captured image is generated by the machine learning using the teacher data as described above, and the generated reference data is stored in the storage device 3. The method of machine learning the reference data is not particularly limited as long as it is a learning method with teacher data, and the description thereof will be omitted. The function of generating the reference data by machine learning may be provided in the information processing device 1 as a learning unit 24 as indicated by a dotted line in FIG. 1, or may be provided in another information processing device.

The control device 2 includes, for example, a processor such as a central processing unit (CPU) or a graphics processing unit (GPU). The control device 2 can have the following functions when the processor executes a computer program stored in the storage device 3, for example. That is, the control device 2 includes a reception unit 20, a detection unit 21, and a processing unit 22 as functional units.

The reception unit 20 has a function of receiving a captured image output from the imaging device 4. The reception unit 20 also includes a function of storing the received captured image in the storage device 3 and a function of outputting the captured image to the detection unit 21. The captured image stored in the storage device 3 is associated with, for example, identification information of the imaging device that captured the captured image, information of the imaging date and time, and the like.

The detection unit 21 has a function of detecting a predetermined detection target from an image captured by the imaging device 4 by using reference data stored in the storage device 3. In the first example embodiment, as described above, the detection target is the object 13 to be gripped (e.g., bottle as illustrated in FIG. 2 or cushioning material as illustrated in FIG. 5) by the hand 11 of the robot arm 10 and the position of the center of gravity M of the object 13. In other words, the detection target is an object to which the driving device 5 whose driving is controlled by the processing unit 22 applies a force, and the position of the center of gravity M of the object. There are various methods for detecting a detection target from a captured image by using reference data generated by machine learning, and here, an appropriate method in consideration of the type of the detection target object, the performance of the information processing device 1, and the like is adopted as the detection method used by the detection unit 21. The description thereof is omitted.

Figure 3:
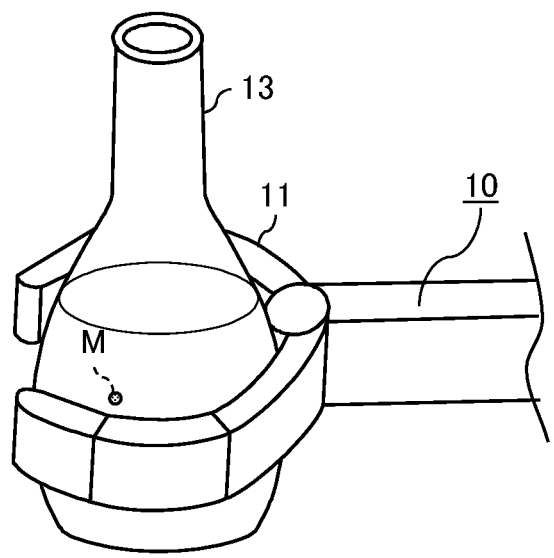
FIG. 3 is a diagram illustrating an operation example of the driving device illustrated in FIG. 2.

The processing unit 22 has a function of controlling the operation of the driving device 5 (robot arm 10) to be controlled, by using information on the detection target detected by the detection unit 21. The first example embodiment focuses on the position of the center of gravity M of the object 13 to be gripped. That is, the processing unit 22 controls the movement and rotation of the robot arm 10 and the opening and closing of the hand 11 in such a way that the hand 11 of the robot arm 10 grips a portion including the center of gravity M of the object 13 to be gripped, as illustrated in FIG. 3. The method of controlling the movement and rotation of the robot arm 10 and the opening and closing of the hand 11 is not limited as long as it is a control method that enables gripping of the portion including the center of gravity M of the object 13 to be gripped, and an appropriate method according to the mechanism of the robot arm 10 and the hand 11 is adopted.

In order for the hand 11 of the robot arm 10 to grip the object 13 to be gripped quickly and accurately under the control of the processing unit 22, information on the distance between the object 13 to be gripped and the hand 11 is required. In a case where the imaging device 4 is an imaging device such as a stereo camera that outputs a captured image including distance information, the distance information can be obtained from the imaging device 4. In a case where a sensor 7 that detects information on the distance between the hand 11 and the object 13 to be gripped is installed in the hand 11 or the like, for example, the sensor output (distance information) of the sensor 7 is acquired by the processing unit 22 through the reception unit 20 as illustrated in FIG. 1.

Figure 6:
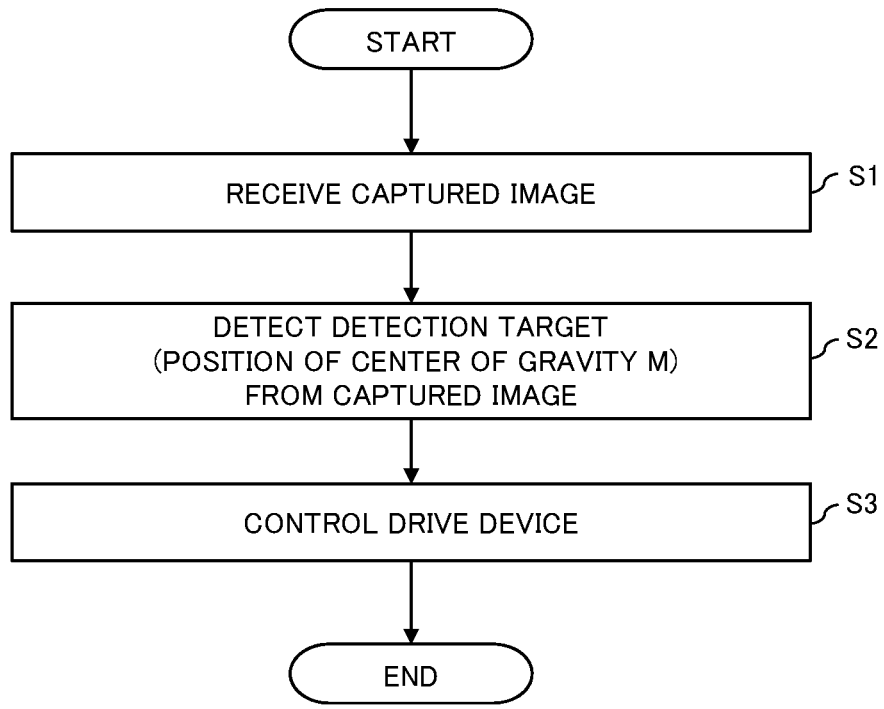
FIG. 6 is a flowchart illustrating an operation example of drive control in the information processing device of the first example embodiment.

Next, an example of a control operation of the driving device 5 (robot arm 10) in the information processing device 1 will be briefly described with reference to FIG. 6. FIG. 6 is a flowchart illustrating a process of controlling the operation of the control device 2 in the information processing device 1.

First, when the reception unit 20 of the information processing device 1 receives a captured image from the imaging device 4 (step S1), the detection unit 21 detects a predetermined detection target (object 13 to be gripped and position of center of gravity M of object 13) from the received captured image (step S2). Thereafter, the processing unit 22 controls the operation of the driving device 5 by using the information detected by the detection unit 21 (step S3). That is, the processing unit 22 controls the operation of the robot arm 10 in such a way that the hand 11 grips a portion including the center of gravity M of the object 13 to be gripped.

The information processing device 1 of the first example embodiment includes the above-described control configuration. As a result, the information processing device 1 can achieve the following effects.

That is, the information processing device 1 is configured to detect the position of the center of gravity M of the object 13 to be gripped from a captured image. A captured image obtained by simply imaging an object does not include information on the position of the center of gravity (In other words, information regarding weight). In the first example embodiment, the detection unit 21 can detect the position of the center of gravity M in the object 13 to be gripped from the captured image, by using reference data based on the learning result of machine learning performed to detect the position of the center of gravity M from the captured image. As a result, the detection unit 21 of the information processing device 1 can easily detect the position of the center of gravity M in the object 13 to be gripped from the captured image, without using the sensor output of a sensor or the like that measures size and without performing calculation to obtain the position of the center of gravity M. That is, the detection unit 21 has a function of detecting information used to control the robot arm 10. In order to detect the information used for the control, the detection unit 21 does not need to acquire sensor output from one or multiple sensors, and does not need to perform multiple processing using the sensor output such as processing of calculating the dimension of the object 13 or processing of calculating the shape of the object 13. As a result, the information processing device 1 can simplify the processing (in other words, control configuration).

The information processing device 1 also includes a control configuration for controlling the robot arm 10 in such a way that the hand 11 grips a portion including the center of gravity M of the object 13 detected as described above. As a result, the robot arm 10 controlled by the information processing device 1 grips the portion including the center of gravity M of the object 13 (i.e., position where object can be stably gripped and held), and can enhance the stability of gripping the object as compared with the case of gripping the other portions of the object 13. That is, the information processing device 1 can improve reliability of motion control of the robot arm 10.

In the case of a container such as a bottle or a plastic bottle containing liquid or a bag containing rice, sand, powder, or the like, even with the same container or bag, the position of the center of gravity changes due to an increase or decrease in the content or a change in posture (i.e., change in uneven distribution of content). Since the portion including the center of gravity of the object is a portion where the object can be gripped and held stably, when the position of the center of gravity changes, the position of the portion appropriate for gripping in the object also changes. By generating and using reference data for detecting the position of the center of gravity from a captured image with many variations of teacher data in consideration of such a situation, the information processing device 1 can easily detect the position of the center of gravity of a container or a bag according to the amount or uneven distribution of the content.

For example, in the case of a transparent or translucent container or bag, it is possible to detect the amount or uneven distribution of the content from the captured image. Hence, the position of the center of gravity of the container or bag according to the amount or uneven distribution of the content can be acquired from the captured image. In a bag whose outer shape changes depending on the amount or uneven distribution of the content, it may be possible to acquire the position of the center of gravity of the bag according to the amount or uneven distribution of the content from the captured image in accordance with multiple pieces of information obtained from the outer shape such as the size, the posture, and the degree of swelling of the bag. In a case where the position of the center of gravity can be acquired from the captured image as described above, reference data for detecting the position of the center of gravity from the captured image is generated by machine learning using, as teacher data, many captured images of the object to be gripped to which information on the position of the center of gravity is assigned. By using the reference data generated in this manner, the information processing device 1 can detect the position of the center of gravity of the container or the bag according to the amount or uneven distribution of the content. Hence, the information processing device 1 can easily detect the position of the center of gravity of the container or the bag according to the amount or uneven distribution of the content. Accordingly, even when the position of the center of gravity changes, the information processing device 1 can grip the container or the bag at a portion where it can be stably gripped without being adversely affected by the change. As a result, the information processing device 1 can further improve reliability of motion control of the robot arm 10.

Second Example Embodiment

Hereinafter, a second example embodiment according to the present invention will be described. In the description of the second example embodiment, the same reference numerals are given to parts having the same name as the components forming the information processing device of the first example embodiment, and redundant description of the common parts will be omitted.

Figure 7:
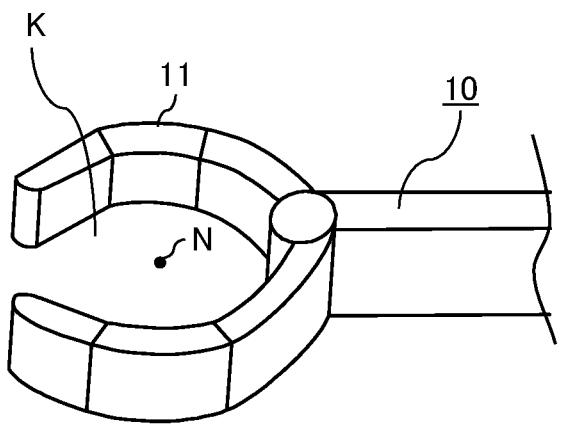
FIG. 7 is a diagram for describing a second example embodiment according to the present invention.

In the second example embodiment, the detection target to be detected from a captured image by a detection unit 21 is, in addition to an object 13 to be gripped and the position of a center of gravity M of the object 13, a control attention point related to a driving device 5 (robot arm 10) controlled by a processing unit 22. Specifically, in the second example embodiment, a control attention point is a central portion N of a space region K defined by a hand 11 of the robot arm 10, as illustrated in FIG. 7 (region surrounded by hand 11 and region whose position changes by driving hand 11).

Reference data generated by machine learning performed to detect such a control attention point N from the captured image is stored in a storage device 3. That is, reference data used in processing of detecting the control attention point N is generated by machine learning using, as teacher data, various captured images of the hand 11 to which information on the position of the control attention point N is assigned.

In the second example embodiment, the detection unit 21 of an information processing device 1 has a function of detecting the object 13 to be gripped and the position of the center of gravity M of the object 13 from the captured image as in the first example embodiment, and also has a function of detecting the control attention point N.

The processing unit 22 controls movement of the hand 11 of the robot arm 10 in a direction in which the control attention point N of the hand 11 coincides with the position of the center of gravity M of the object 13 to be gripped, and controls the robot arm 10 to cause the hand 11 to grip the object 13 to be gripped.

The configuration of the information processing device 1 of the second example embodiment other than the above is similar to the configuration of the information processing device 1 of the first example embodiment.

The information processing device 1 of the second example embodiment has a configuration similar to that of the first example embodiment. As a result, effects similar to those of the first example embodiment can be obtained. Moreover, the information processing device 1 of the second example embodiment detects the control attention point N of the hand 11 from the captured image, and controls the movement of the robot arm 10 in a direction in which the control attention point N of the hand 11 coincides with the position of the center of gravity M of the object 13 to be gripped. As a result, the information processing device 1 can improve reliability of control for causing the hand 11 to grip the object 13 to be gripped at a portion where the object 13 can be stably gripped. The control attention point may be appropriately set in a space region or a partial region of a driving device to be controlled by the processing unit 22 according to the configuration of the device, as long as the control attention point is in a region where its position changes by driving of the driving device controlled by the processing unit 22. Thus, the position of the control attention point is not limited to the example described in the second example embodiment.

Third Example Embodiment

Hereinafter, a third example embodiment according to the present invention will be described. In the description of the third example embodiment, the same reference numerals are given to parts having the same name as the components forming the information processing devices of the first and second example embodiments, and redundant description of the common parts will be omitted.

Figure 8:
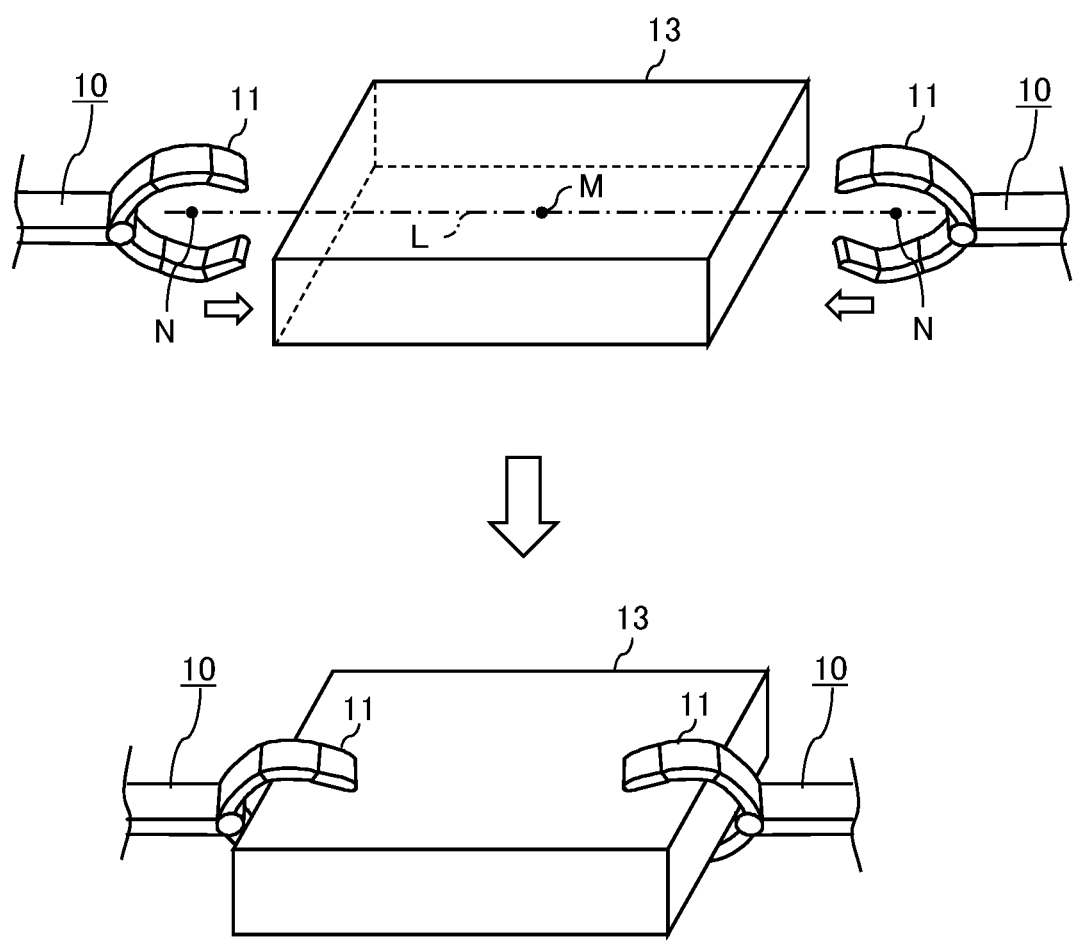
FIG. 8 is a diagram for describing an example of control of a driving device by an information processing device according to a third example embodiment of the present invention.

In the third example embodiment, as illustrated in FIG. 8, a driving device 5 controlled by a processing unit 22 includes two robot arms 10. As in the second example embodiment, a detection unit 21 detects an object 13 to be gripped and the position of a center of gravity M of the object 13 from the captured image, and also detects a control attention point N of a hand 11. In the third example embodiment, since there are two robot arms 10, the control attention point N of the hand 11 is detected for each robot arm 10.

In the third example embodiment, as shown in FIG. 8, the processing unit 22 controls the robot arms 10 in such a way that the control attention points N of the hands 11 of the two robot arms 10 and the position of the center of gravity M of the object 13 to be gripped are spaced apart from one another on the same virtual straight line. Moreover, from such a layout, the processing unit 22 controls movement of each robot arm 10 in a direction in which the control attention point N of the hand 11 approaches the center of gravity M of the object 13 to be gripped, and controls the robot arm 10 in such a way that the hand 11 grips the object 13.

The configuration of the information processing device 1 of the third example embodiment other than the above is similar to the configuration of the information processing device 1 of the second example embodiment.

Figure 9:
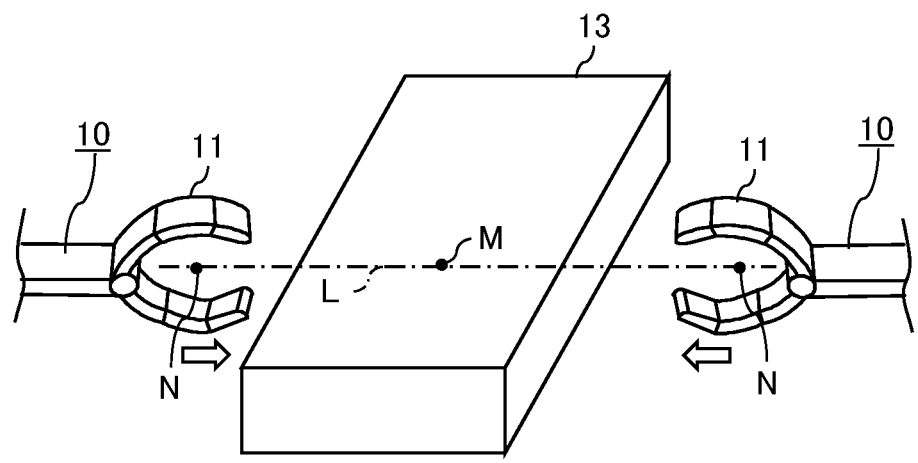
FIG. 9 is a diagram for describing another example of control of the driving device by the information processing device of the third example embodiment.
Figure 9:
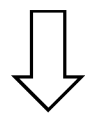
Figure 9:
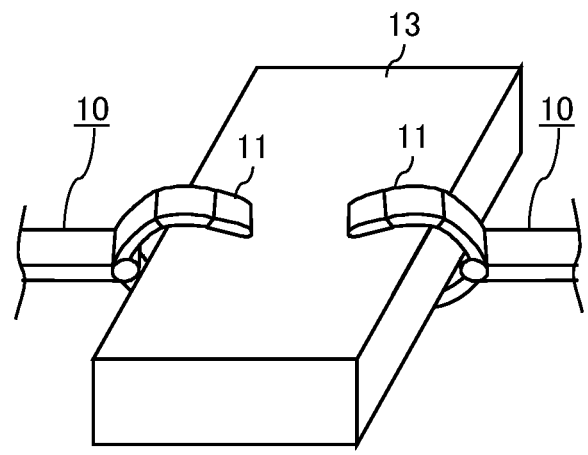
Figure 10:
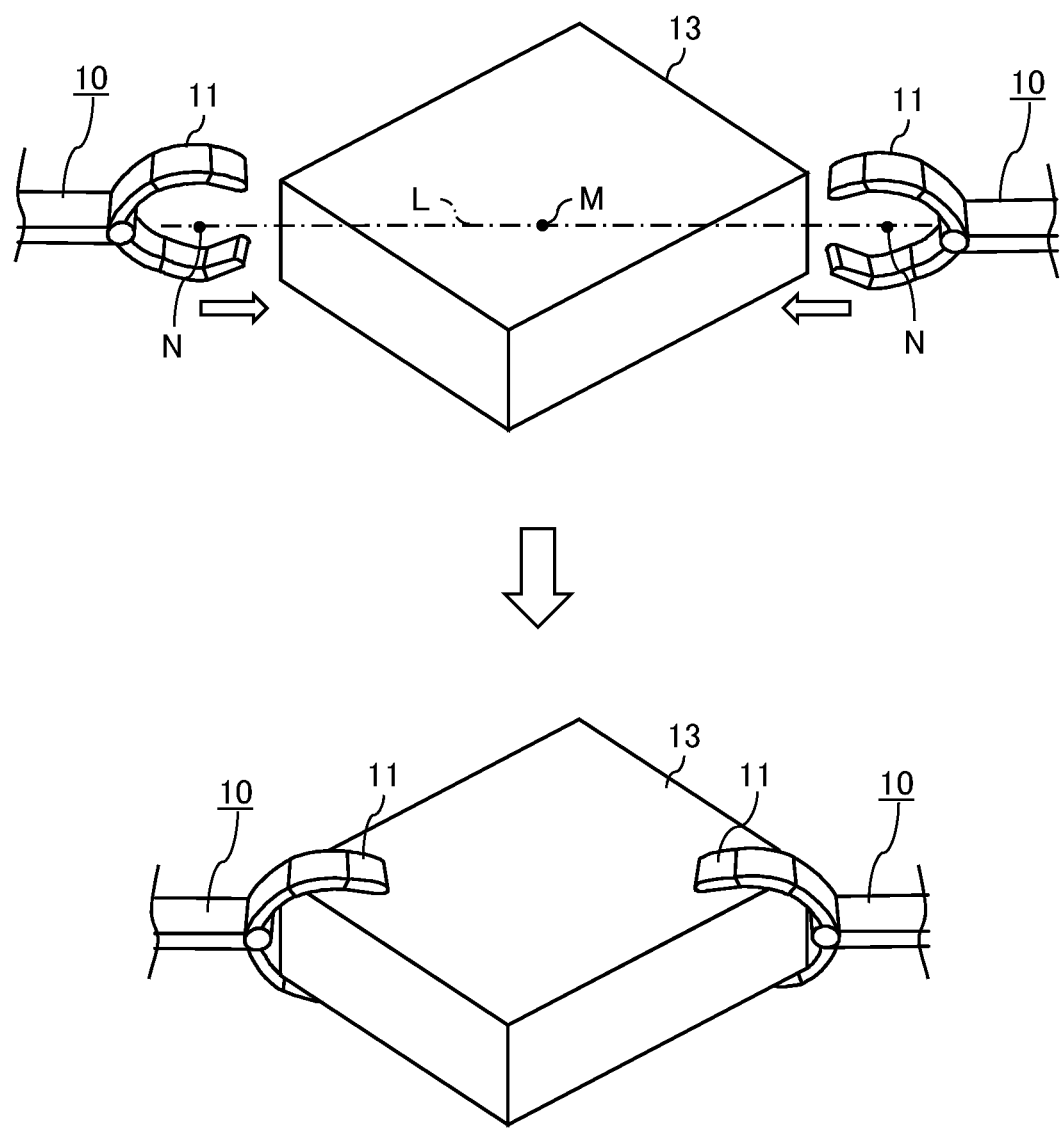
FIG. 10 is a diagram for describing yet another example of control of the driving device by the information processing device of the third example embodiment.

The information processing device 1 of the third example embodiment can achieve effects similar to those of the first and second example embodiments. Moreover, the information processing device 1 controls the robot arm 10 in such a way that the hands 11 grip the object 13 to be gripped from both sides of the object 13 while maintaining the state in which the control attention points N of the hands 11 and the center of gravity M of the object 13 to be gripped are arranged on the same virtual straight line. Such control of the robot arm 10 by the information processing device 1 can improve stability of gripping of the object 13 to be gripped. Even when the orientation of the object 13 to be gripped with respect to the robot arms 10 is as illustrated in FIGS. 9 and 10, the information processing device 1 can cause the hands 11 of the robot arms 10 to grip the object 13 to be gripped by the functions of the detection unit 21 and the processing unit 22 as described above.

Fourth Example Embodiment

Hereinafter, a fourth example embodiment according to the present invention will be described. In the description of the fourth example embodiment, the same reference numerals are given to parts having the same name as the components forming the information processing devices of the first to third example embodiments, and redundant description of the common parts will be omitted.

Figure 11:
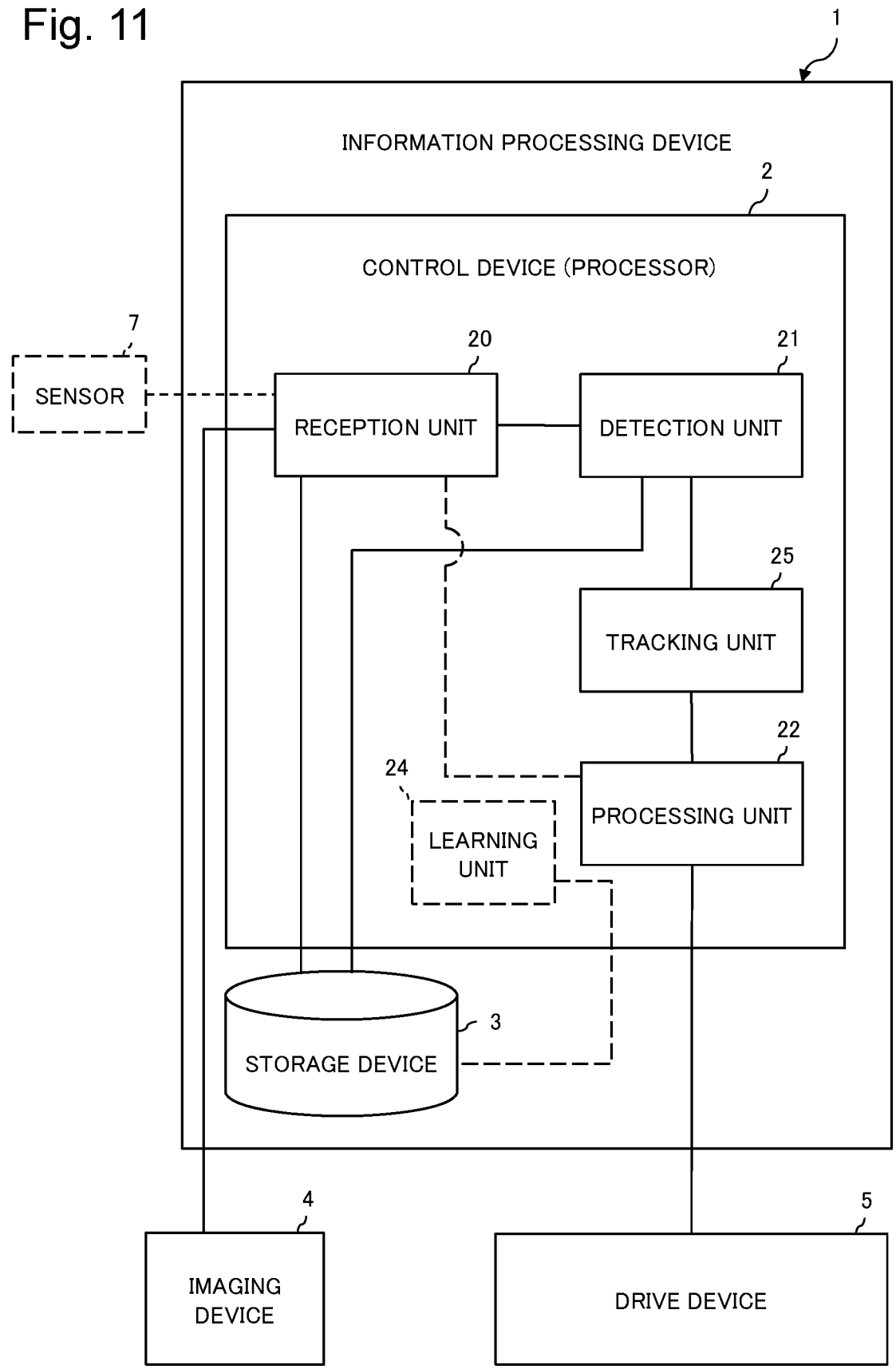
FIG. 11 is a block diagram illustrating a simplified configuration of an information processing device of a fourth example embodiment according to the present invention.

FIG. 11 is a block diagram illustrating a simplified configuration of an information processing device of the fourth example embodiment. A driving device 5 controlled by an information processing device 1 of the fourth example embodiment is, for example, a device (device that sprays water, emits sound, emits light, or the like toward vermin) having a function of repelling vermin that damages a field or the like. Alternatively, the driving device 5 is a device that tosses food to fish in a cage in culture. The imaging device 4 is installed in such a way that it can image a predetermined region (monitoring area to be protected from vermin, water surface area of cage, and the like) necessary to control driving of the driving device 5.

Figure 12:
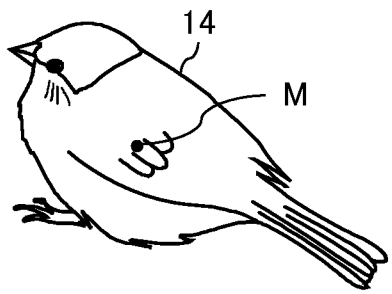
FIG. 12 is a diagram illustrating an example of a moving object detected by the information processing device according to the fourth example embodiment.
Figure 13:
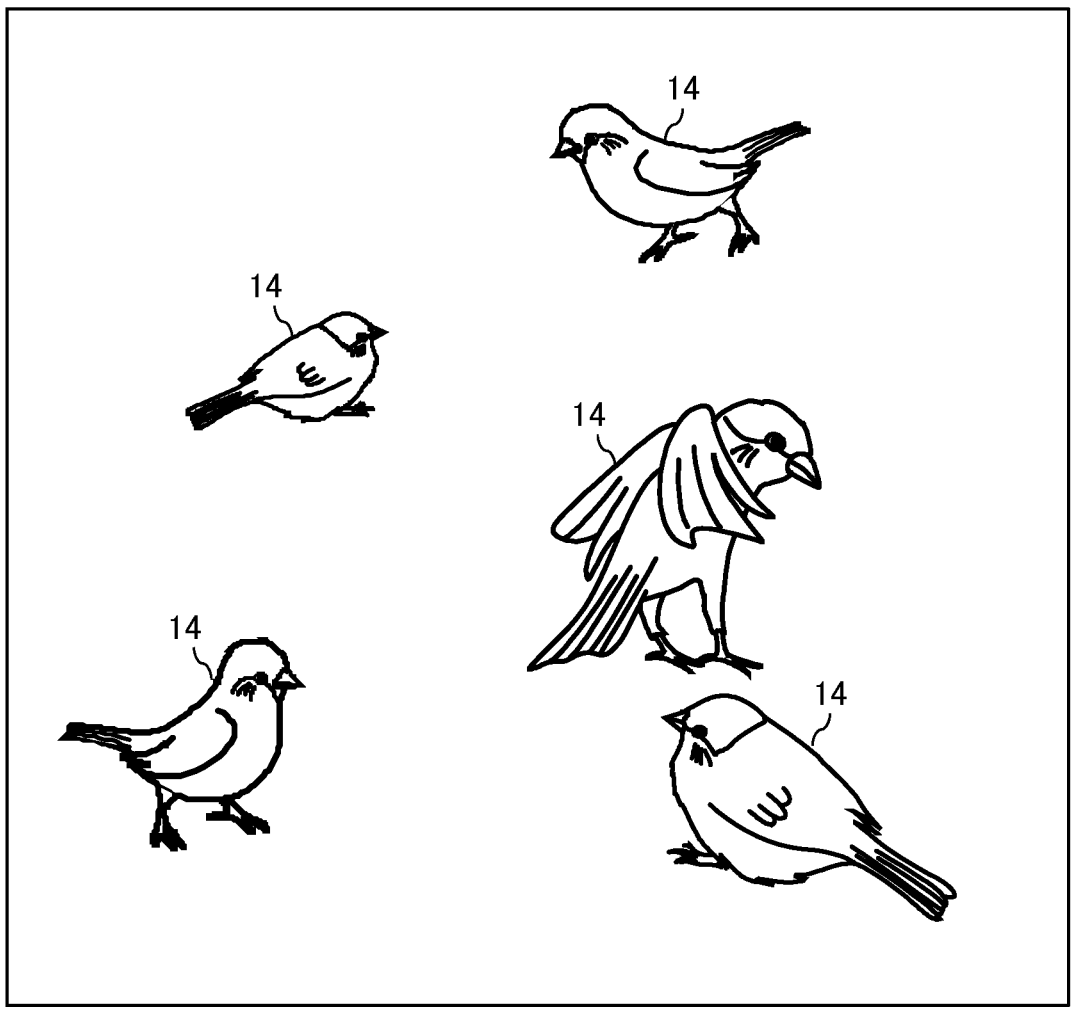
FIG. 13 is a diagram illustrating a modification of the moving object.

The detection target to be detected by a detection unit 21 in a control device 2 is a creature which is a moving object 14 and the position of a center of gravity M of the object 14, as illustrated in FIG. 12. As illustrated in FIG. 13, the posture of a creature changes in various ways. For this reason, reference data used in processing of detecting the moving object 14 and the position of a center of gravity M of the moving object 14 is generated by teacher data in consideration of such a posture change (teacher data of reference image, image with background, partial image, and deformed image as described in first example embodiment). The reference data generated in this manner is stored in a storage device 3 of the information processing device 1, and the detection unit 21 detects the moving object 14 to be detected from a captured image by using the reference data.

In the fourth example embodiment, the control device 2 includes a tracking unit 25 in addition to a reception unit 20, the detection unit 21, and a processing unit 22. The tracking unit 25 has a function of tracking a detection target detected by the detection unit 21 in multiple captured images captured continuously or intermittently. There are various tracking methods, and the tracking method used by the tracking unit 25 is not limited. For example, there are a method using a Kalman filter or a particle filter and a method using a tracking rule given in advance. In the method using a tracking rule, the following rule is given as one of the tracking rules, for example. The rule is that when comparing a captured image subjected to detection processing and a captured image of detection processing at the next time point, the detected displacement distance of the center of gravity M of the detection target is not too large and is equal to or less than a set value. For example, the set value is set on the basis of a moving speed assumed in consideration of the type of creature to be detected, and the like. A rule that the moving direction of the creature matches is also given as the tracking rule. The moving direction of the creature is detected by using, for example, an image of the creature's head and moving direction detection data acquired by machine learning. In the machine learning, the image of the creature's head to which information on the moving direction of the creature is assigned is used as teacher data, and the moving direction detection data is generated on the basis of such teacher data. In the method using a tracking rule, a creature is tracked by detecting (selecting) a creature that is highly probably the same creature from multiple images captured at different time points by using the tracking rule as described above.

The processing unit 22 controls driving of the driving device 5 to be controlled (e.g., operation of motor or solenoid valve) on the basis of information on the creature detected by the detection unit 21 and tracked by the tracking unit 25. The driving control method of the driving device 5 is a method corresponding to the type of the driving device 5, and an appropriate method is adopted. Here, although the description is omitted, the processing unit 22 may control the driving device 5 by predicting the position and moving direction of the moving object 14 at the time of control using the latest moving direction obtained from tracking information by the tracking unit 25 and the moving amount per predetermined unit time, for example.

The configuration of the information processing device 1 of the fourth example embodiment other than the above is similar to the configuration of the information processing device 1 of the first to third example embodiments.

The information processing device 1 of the fourth example embodiment is configured as described above. That is, the information processing device 1 has a configuration that enables detection of the position of the center of gravity M of the moving object 14 on which the driving device 5 acts from the captured image, and control of the operation of the driving device 5 using the information on the position of the center of gravity M. As a result, as compared with a case where the driving device 5 is controlled by using the contour of the moving object 14 and the position of the head, the driving device 5 (water spraying device) can increase the accuracy of water hitting the moving object 14 (vermin). That is, the information processing device 1 can increase the accuracy of the action of the driving device 5 on the moving object 14.

The information processing device 1 according to the fourth example embodiment also includes the tracking unit 25. Hence, even if the object on which the driving device 5 acts is the moving object 14, the information processing device 1 can control the driving device 5 in consideration of the movement of the moving object 14 in such a way that the driving device 5 accurately acts on the moving object 14 that moves from moment to moment.

Figure 14:
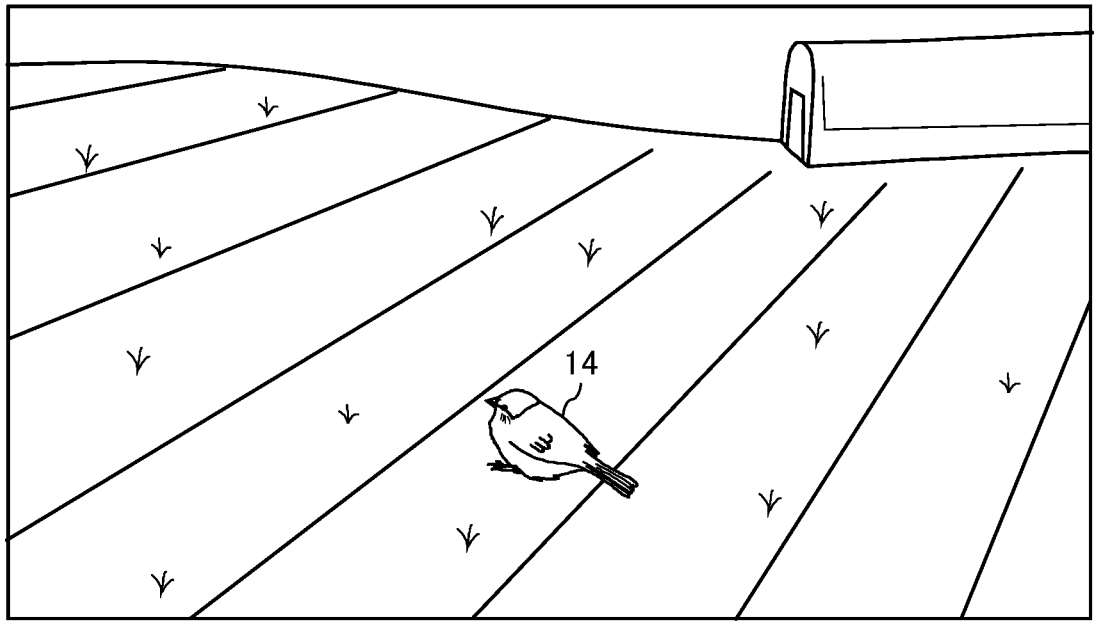
FIG. 14 is a diagram for describing an effect of a tracking function in the information processing device of the fourth example embodiment.
Figure 15:
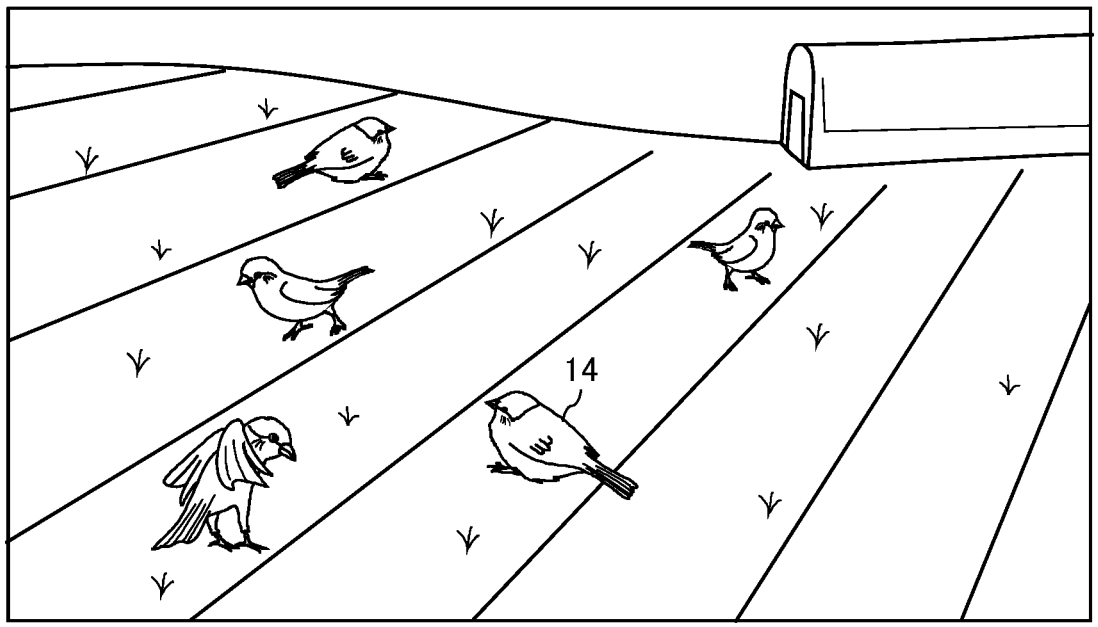
FIG. 15 is a diagram for describing an effect of the tracking function together with FIG. 14.

Moreover, since the information processing device 1 includes the tracking unit 25, the following effects can also be obtained. For example, in an image captured after detecting the moving object 14 from a captured image as illustrated in FIG. 14, even if the detected moving object 14 and a similar moving object are captured as illustrated in FIG. 15, the information processing device 1 can continuously detect the detected moving object 14. As a result, it is possible to prevent the action target of the driving device 5 from changing frequently, and the information processing device 1 can perform stable control of the driving device 5.

Figure 16:
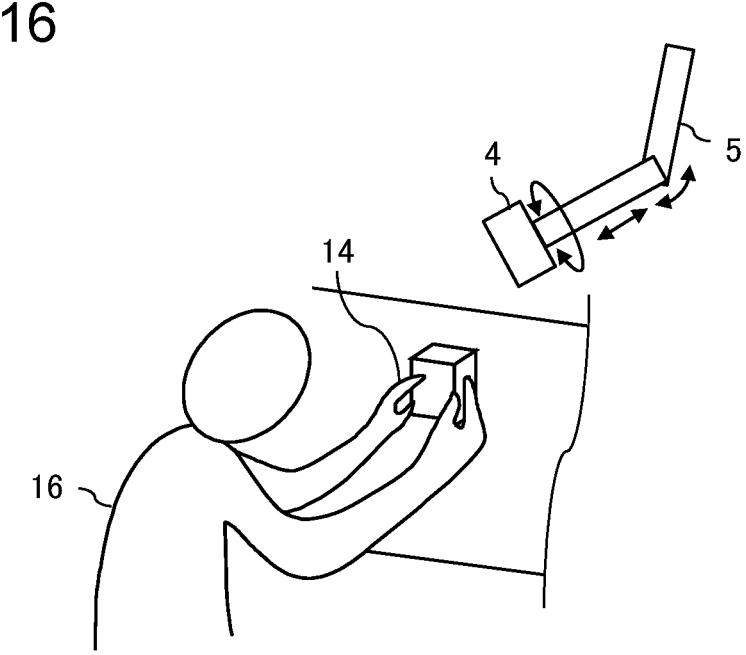
FIG. 16 is a diagram for describing another application example of the information processing device of the fourth example embodiment.

The information processing device 1 of the fourth example embodiment is also applicable to control for driving the following driving device. For example, in the above-described example, the imaging device 4 is fixed. Instead, it is assumed that the imaging device 4 is attached to an arm that is the driving device 5 as illustrated in FIG. 16, and the imaging device 4 can displace the imaging range by driving the driving device 5 (arm). it is also assumed that the imaging device 4 is set to image the work range of the hands of a worker 16. The detection unit 21 has a function of detecting a hand 14 that is a moving object of the worker 16 and the position of the center of gravity of the hand 14. In order to detect the hand 14 of the worker 16 and the position of the center of gravity of the hand, reference data is generated by machine learning using teacher data by the reference image, the image with background, the partial image, and the deformation image similar to those described above, and the reference data is stored in the storage device 3. The detection unit 21 performs detection processing by using the reference data. The tracking unit 25 tracks the hands of the worker 16. The processing unit 22 uses the information obtained by the detection unit 21 and the tracking unit 25 to control the operation of the driving device 5 (arm to which imaging device 4 is attached) in such a way as to displace the imaging range of the imaging device 4 following the movement of the hands of the worker 16 (i.e., status of work). In such a case, too, the information processing device 1 can achieve an effect similar to that described above.

Moreover, as another application example of the information processing device 1 of the fourth example embodiment, the imaging device 4 and the information processing device 1 may be mounted on a robot as the driving device 5 having a self-propelled function. In this case, for example, the detection unit 21 detects a moving object to be detected and the position of the center of gravity of the moving object, and the tracking unit 25 tracks the moving object to be detected. The processing unit 22 controls the operation of the moving mechanism as the driving device 5 of the robot in such a way that the robot on which the information processing device 1 is mounted moves according to the movement of the moving object (i.e., in such a way as to follow moving object). In a case where a mechanism for changing the direction of the imaging device 4 is provided, the processing unit 22 may control the mechanism as the driving device 5 for changing the direction of the imaging device 4 in such a way that the moving object is positioned at the center of the captured image, for example, according to the movement of the moving object.

Furthermore, in the above-described example in which the information processing device 1 is mounted on the robot, an example in which the detection target detected by the detection unit 21 is a moving object has been described. Instead, the detection target may be, for example, a fixed mark representing a target point toward which the robot is headed. It is considered that the imaging range of imaging device 4 is displaced by the movement of the robot, and the position of the detection target in the captured image changes even though the detection target does not move. Even in such a case, the information processing device 1 of the fourth example embodiment can continuously detect the detection target by the function of the tracking unit 25.

Furthermore, in a case where the control attention point N in the driving device 5 as described in the second and third example embodiments is detected as the detection target by the detection unit 21, the tracking unit 25 may track the control attention point N as well. The processing unit 22 may control the driving device 5 by using information including the tracking result of the control attention point N as well.

Other Example Embodiments

The present invention is not limited to the first to fourth example embodiments, and various example embodiments can be adopted. For example, the information processing device 1 according to the first to fourth example embodiments may include a display control unit (not illustrated) that controls a display device (not illustrated) to superimpose and display information indicating a detection target detected by the detection unit 21 on a captured image. The display control unit may control the display device in such a way as to display the tracking result by the tracking unit 25 in the fourth example embodiment.

Figure 17:
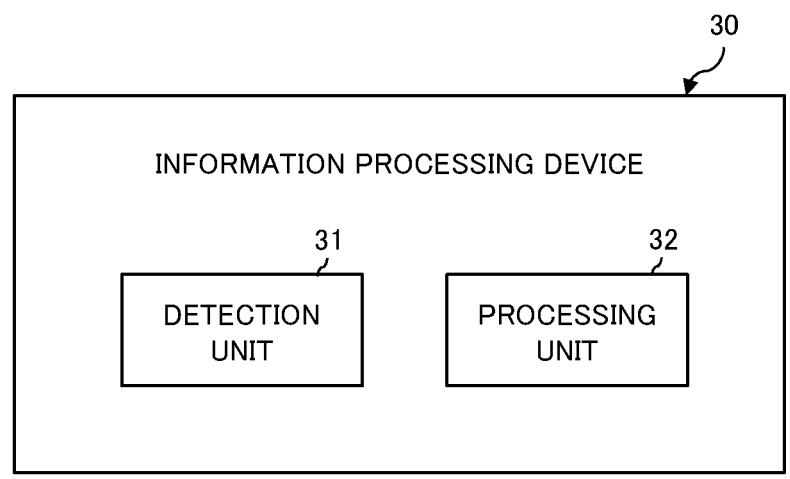
FIG. 17 is a block diagram illustrating a simplified configuration of an information processing device of another example embodiment according to the present invention.

FIG. 17 is a block diagram illustrating a simplified information processing device of another example embodiment of the present invention. An information processing device 30 includes a detection unit 31 and a processing unit 32. The detection unit 31 has a function of detecting the detection target from a captured image by using reference data that is a learning result obtained by machine learning of the detection target including the position of the center of gravity of an object in the captured image. The processing unit 32 has a function of controlling the driving device to be controlled that acts on the object having the center of gravity detected by the detection unit 31, by using the detection result of the detection unit 31. Such an information processing device 30 is implemented by a processor, for example, as in the case of the information processing device 1 in the first example embodiment.

Since the information processing device 30 detects the position of the center of gravity of the object from the captured image by the function of the detection unit 31, the position of the center of gravity can be easily detected. That is, the detection unit 31 has a function of detecting information used to control the driving device. In order to detect the information used for the control, the detection unit 31 does not need to acquire sensor output, and does not need to perform multiple processing such as dimension calculation processing using the acquired sensor output, for example. As a result, the information processing device 30 can simplify the control configuration for controlling the driving device. Moreover, by controlling the driving device using the position of the center of gravity of the object, the information processing device 30 can reduce failure of the gripping operation of the driving device, for example, and can improve reliability for control of the driving device.

The present invention has been described by using the above example embodiments as model examples. However, the present invention is not limited to the above example embodiments. That is, the present invention can apply various aspects that can be understood by those skilled in the art within the scope of the present invention.

This application is based upon and claims the benefit of priority from Japanese patent application No. 2019-46023, filed on Mar. 13, 2019, the disclosure of which is incorporated herein in its entirety by reference.

REFERENCE SIGNS LIST 1, 30 information processing device
4 imaging device
5 driving device
21, 31 detection unit
22, 32 processing unit

What is claimed is:

1. An information processing device comprising:
at least one processor configured to:
  detect a detection target from a captured image by using reference data that is a learning result obtained by machine learning of the detection target including a position of a center of gravity of an object in the captured image, the detection target being the object of which the center of gravity changes due to a change in either or both of an outer shape and a condition of contents; and
  control a driving device to be controlled that acts on the object by using a result of the detection.

2. The information processing device according to claim 1, wherein the at least one processor tracks the detection target by using the result of the detection.

3. The information processing device according to claim 1, wherein the detection target also includes a predetermined control attention point in a region whose of which a position changes by driving of the driving device, and the at least one processor detects the control attention point in addition to the position of the center of gravity of the object from the captured image.

4. The information processing device according to claim 3, wherein the at least one processor controls the driving device in such a way that, from a state in which the position of the center of gravity of the detected object and the control attention point in a device having a gripping function as the driving device are arranged on a same virtual straight line, the control attention point moves in a direction approaching the position of the center of gravity of the object and grips the object.

5. The information processing device according to claim 1, wherein the at least one processor generates the reference data by performing the machine learning on the detection target including the position of the center of gravity of the object in the captured image.

6. A driving control method comprising:
by at least one processor,
  detecting a detection target from a captured image by using reference data that is a learning result obtained by machine learning of the detection target including a position of a center of gravity of an object in the captured image, the detection target being the object of which the center of gravity changes due to a change in either or both of an outer shape and a condition of contents; and
  controlling a driving device to be controlled that acts on the object by using a result of the detection.

7. A non-transitory program-recording medium storing a computer program for causing a computer to execute:
  detecting a detection target from a captured image by using reference data that is a learning result obtained by machine learning of the detection target including a position of a center of gravity of an object in the captured image, the detection target being the object of which the center of gravity changes due to a change in either or both of an outer shape and a condition of contents; and
  controlling a driving device to be controlled that acts on the object by using a result of the detection.

* * * * *